United States Patent [19]
Barrows

[11] Patent Number: 5,851,574
[45] Date of Patent: Dec. 22, 1998

[54] METHOD FOR AGGLOMERATING FINE POWDERS

[75] Inventor: Frederic T. Barrows, Bozeman, Mont.

[73] Assignee: The United States of America as represented by the Secretary of the Interior, Washington, D.C.

[21] Appl. No.: 791,150

[22] Filed: Jan. 28, 1997

[51] Int. Cl.$^6$ ...................................................... A23L 1/025
[52] U.S. Cl. ................................. 426/285; 426/1; 426/805
[58] Field of Search .................................. 426/1, 285, 805

[56] References Cited

U.S. PATENT DOCUMENTS 5,653,973  8/1997  Lew et al. ..................................... 426/1

OTHER PUBLICATIONS

Perry, R., Chemical Engineers' Handbook, 4$^{th}$ Ed. McGraw–Hill Book Co., N.Y., pp. 8–22, 1963.

Perry, R, Perrys' Chemical Engineering Handbook, 7$^{th}$ Ed, McGraw–Hill, N.W., 1997.

*Primary Examiner*—Helen Pratt
*Attorney, Agent, or Firm*—E. Philip Koltos

[57] ABSTRACT

A method is provided for producing feed particles of a desired size in a 20 to 1000 $\mu$m size range for uses such as a larval aquatic feed. The method uses a marumerizer comprising a cylindrical housing have a grooved bottom, and includes the steps of placing a wet mash of the particle material (e.g., a larval aquatic feed material) in the marumerizer, placing in the marumerizer a charge of inert beads of a size (e.g., 3 mm) substantially larger than that of the particles to be produced, and rotating the marumerizer with the wet mash and charge of inert beads therein so that the beads compact and shape the mash into formed spheroidal particles.

17 Claims, No Drawings

METHOD FOR AGGLOMERATING FINE POWDERS

FIELD OF THE INVENTION

The present invention relates to methods for producing particles for various uses including aquatic feeds, and, more particularly, to an improved method for the production of discrete particles, in contrast to crumbs, of a very small size, preferably in the 50 to 1000 μm size range.

BACKGROUND OF THE INVENTION

Currently, commercially available feeds are not effective in supporting the restoration of many endangered species of aquatic life such as fish. An important reason for this is the size of the feed particles, i.e., the particles are too large to be attractive to the fish larvae. Commonly used prior art methods of producing feed particles of a relatively small size generally involve the initial production of large pellets which are then ground, cracked or otherwise broken down into smaller pieces, followed by obtaining the appropriate sizes by sifting of these pieces. This method results in crumbled particles which promote the growth of bacteria and fungus. In this regard, the growth of bacteria and fungus in the fish tank has been found to be severe when feeding crumbled diets. An additional problem with the so-called "crumbling" method described above is that the method results in a low yield of particles of a single desired size. This requires reprocessing of the off-size particles (i.e., the particles of a size other than that desired) which increases the cost of production. Other techniques require the addition of heat in the formation of the particles. The addition of heat can adversely affect the digestion by larval fish of the protein in the particles.

Other methods of making feeds are discussed in the patented art. U.S. Pat. No. 4,073,946 to Bayless discloses a method of making marine larval feed in the form of microglobules of a size of about 1 to 1000 mm wherein the base ingredients are blended in a high-speed attritor or blender to produce a paste. U.S. Pat. No. 5,158,788 to Lavens et al., U.S. Pat. No. 5,047,250 to Prieels et al. and U.S. Pat. No. 3,939,279 to Kawano et al. all disclose feeds or aquaculture larvae prepared from yeasts, while U.S. Pat. No. 4,931,291 to Kojima et al. and U.S. Pat. No. 4,906,479 to Kitagawa et al. both disclose feeds for aquaculture larval prepared from unicellular algae.

Although the discussion above concerns making aquacultural feeds, the method of the invention has more general application as will appear from the discussion hereinbelow. There are, of course, many different devices used for producing pellets or particles. U.S. Pat. No. 5,447,683 to Yano et al. discloses a method for producing microgranulated particles of a size less than 200 μm for pharmaceutical preparations for poorly soluble or poorly absorbable drugs wherein fine powder is sprayed with a solution containing a binder while being agitated, tumbled or fluidized. A number of devices are stated in the patent to be suitable for mixing and stirring and for microgranulation including a "New-Marumerizer" which is described as being a multi-function combined granulation coater of the agitating tumbling, fluidized type.

SUMMARY OF THE INVENTION

In accordance with the invention, a method is provided for producing discrete particles of very small size for various uses including aquacultural feeds, medicated particles and other pharmaceutical uses, human foods, dairy feeds and other uses. One important use is making particles or pellets for larval aquatic feeds and the like, in a desired size range, which are both palatable and nutritious. With respect to size, the method of the invention permits production of discrete particles in the 20 to 1000 μm size range and, moreover, enables the production of particles less than 200 μm in size with significant yields.

In accordance with a preferred embodiment of the invention a method is provided for producing particles of diameters within a desired size range, the method comprising: placing a wet mash of material in a marumerizer; placing in the marumerizer a charge of inert elements of a size which is preferably substantially larger than the particles to be produced; and activating the marumerizer to provide spinning of the wet mash and the inert elements in the marumerizer so that the inert elements compact the mash into particles of a substantially spheroidal shape.

Preferably, the inert particles are plastic beads. Advantageously, the plastic beads are about 3mm in diameter and comprise polyethylene beads, although a number of other materials and sizes can be employed, as discussed below.

In an advantageous implementation, the method is controlled to produce particles of a diameter less than 300 μm, while in another advantageous implementation, the method is controlled to produce particles of a diameter less than 200 μm.

A relatively large size for the inert particles facilitates a preferred final step comprising separating the inert particles from the spheroidal particles.

The method of the invention provides a number of advantages over the conventional "crumble" method described above including greater nutrient stability, a higher yield of particles of the desired size, improved palatability and reduced tank fouling owing to particle crumbling. The present method is also simpler than an extruder-marumerizer technique described below (e.g., no extruder is needed) and, in addition, enables small particles (less than 200 μm) to be made and provides for high survival when fed in larger sizes (about 400 μm).

Other features and advantages of the invention will be set forth in, or apparent from, the detailed description of the preferred embodiments of the invention which is found hereinbelow.

DESCRIPTION OF THE PREFERRED EMBODIMENTS

It will be understood that although the discussion below focuses on feed particles, the method of the invention can be used to advantage in making other different kinds of particles as was mentioned hereinbefore. A preferred embodiment of the method of the invention employs a marumerizer to shape the particles to be produced. A conventional marumerizer comprises a cylindrical apparatus in which the bottom thereof is grooved and which rotates at high speed to provide high speed spinning of any charge placed therein. In a specific embodiment, the marumerizer can be that made by L.C.I. Inc., of Charlotte, N.C.

In contrast to methods I have previously used wherein an extruder is used to preform the particles, in the method of the invention a wet mash of the materials or constituents for the particles is placed in the marumerizer along with a charge of inert elements such as balls or beads. In accordance with an advantageous embodiment, these beads are 3 mm in diameter although beads of larger or smaller size can be used, the bead size preferably being in the range of between about 50 µm and 10 mm in diameter. Among other advantages, the use of relatively large beads enables the beads to be readily separated from the formed particles.

In one preferred embodiment, the beads are preferably made of a plastic such as "DOW Polyethylene" or another polyethylene. Although it is possible to use other plastics, my research has indicated that many plastic materials are unsuitable and that, in this regard, using the wrong plastic material will result in poorly formed particles, plastic fragments in the feed, very dense feed particle or no particle formation at all. However, the inert elements can be made from other materials for many applications, and may vary in density from high density (elements made from steel, silica, ceramics and the like) to low density (elements made from polyethylene and polystyrene). Each size and type of inert element will impart somewhat different characteristics to the particles to be produced.

Continuing with the discussion of a preferred embodiment of the invention, after the wet mash and inert plastic beads are supplied to the marumerizer, the latter is activated and the spinning thereof forces the plastic beads to come into contact with each other and with the sides of the marumerizer machine. This compacts the mash into spheroidal shapes.

The method can also be used to evenly distribute product liquids in a dry particulate form. The size of the final product produced can be controlled by controlling a number of different factors including the mash formulation, the moisture content of the mash, the time of marumerization, and the size, density, shape and loading rate of the inert elements added to the marumerizer. The variable or parameter having the most influence on the final product is the physical characteristics of the ingredients themselves. The moisture content, and the size, density, shape and rate of feed of the inert elements can be varied to compensate for characteristics of the ingredients. Added moisture levels of between 5 and 60% of the weight of the dry ingredients have been used. The more hydroscopic the ingredients, the lower the required moisture level. Any water soluble substance can be distributed with the water, such as flavors or vitamins.

The marumerization time and speed chosen is most influenced by the moisture level. Higher moisture levels usually require less marumerization time. The time can vary widely and times ranging between 5 seconds and 9 minutes have been used with a variety of formulations.

As mentioned above, the size and density of the inert elements affect the size and density of the final product. In this regard, the density of the inert elements is directly correlated to the density of the final product, i.e., high density inert particles result in high density final product. On the other hand, the relationship between the size of the inert elements and the final particle size is not linear, and appears to be affected by the marumerization time and material formulation. Longer marumerization times result in larger particles. Marumerization speed is generally varied between 300 and 1210 r.p.m. The higher speeds are used with formulations that are not as adhesive as formulations processed at lower speeds.

The method of the present invention should be contrasted with the extruder-marumerizer method referred to above which has also been used by me to produce feeds for larval fish. In general, this other method involves using extrusion in combination with marumerization, i.e., the feed particles are shaped or formed by the extruder and the already formed particles are then placed in the marumerizer wherein the spinning motion reshapes the particles into ovoid shapes. This method has been used by me to make particles of diameters down to about 500 µm. It is believed that with a different, more costly extruder, particles of 300 µm in diameter can be made. However, to my knowledge, this method cannot be used to make particles of sizes in the 50 to 300 µm range and the density of the particle produced can not be changed as with the method of the present invention. It should be noted that for the particular parameters used in the preferred embodiment, the method of the present invention produces particles that are less dense than the particles produced using the micro-extrusion and marumerization method but that feeding trials have shown higher survival when feeding the particles of the present invention. Thus, the method of the invention provides important advantages over the extruder-marumerizer method including the capability of making particles less than 200 µm in diameter with significant yields and the ability to support high survival when fed in a larger (about 400 µm) size range.

The advantages of the method the invention over the "crumble" process, which is discussed above and which is commonly used in the field, include: (1) higher yield of on-size particles, i.e., particles within a desired size range; (2) greater ability to control density (3) greater acceptance by fish larvae (palatability); (4) reduced tank fouling because of bacteria and fungus due to particle disintegration.

In general, the particles produced by the method of the invention are water stable and highly palatable, and thus capable of supporting high levels of survival of larval fish. The feeds can also be used for the production of shrimp larvae, one of the fastest growing segments of the aquaculture industry. Again, although the method is particularly suitable for such aquacultural applications, the method can also be used in other applications, i.e., other than for aquacultural feeds, wherein particles of the small size provided (20 to 1000 µm) are needed, e.g., in the field of pharmaceutical, industrial applications such as fertilizers, and so on, as discussed previously.

Although the present invention has been described to specific exemplary embodiments thereof, it will be understood by those skilled in the art that variations and modifications can be effected in these exemplary embodiments without departing from the scope and spirit of the invention.

I claim:

1. A method for agglomerating feed particles of diameters within a desired size range for use as a larval aquatic feed, said method comprising:

placing, in a marumerizer, a wet charge of a larval aquatic feed material from which particles are to be produced;

placing, in said marumerizer a further charge of inert elements of a diameter between 50 µm and 10 mm; and activating said marumerizer to provide spinning of said wet charge and said inert elements in the marumerizer so that the inert elements compact and agglomerate the wet charge into shaped feed particles of a diameter less than 1000 µm.

2. A method as claimed in claim 1, wherein said inert element comprise plastic beads.

3. A method as claimed in claim 2 wherein the plastic beads comprise polyethylene beads.

4. A method as claimed in claim 2 wherein said beads have a diameter of 3 mm.

5. A method as claimed in claim 1 wherein said inert elements comprise high density particles.

6. A method as claimed in claim 5 wherein said high density particles comprise a high density material selected from the group consisting of steel, silica and ceramics.

7. A method as claimed in claim 1 wherein said method is controlled to produce particles of a diameter less than 200 µm.

8. A method as claimed in claim 1 further comprising separating inert elements from the shaped particles.

9. A method of producing feed particles of a desired size in a 20 to 1000 µm size range for use as a larval aquatic feed, said method comprising:

utilizing a marumerizer comprising a cylindrical housing having a grooved bottom;

placing in said marumerizer a wet mash of larval aquatic feed material;

placing in said marumerizer a charge of inert elements of a size substantially larger than that of the feed particles to be produced; and rotating said marumerizer with said wet mash and said charge therein so that said inert elements compact and shape the mash into formed particles.

10. A method as claimed in claim 9 wherein said insert elements comprise plastic beads.

11. A method as claimed in claim 10 wherein the beads are about 3 mm in diameter.

12. A method as claimed in claim 10 wherein said plastic beads comprise polyethylene beads.

13. A method as claimed in claim 10 wherein said method is controlled to produce particles of a diameter less than 200 µm.

14. A method as claimed in claim 9 wherein said method is controlled to produce spheroidal particles of a diameter less than 300 µm.

15. A method as claimed in claim 9 wherein said method is controlled to produce particles of a diameter less than 200 µm.

16. A method as claimed in claim 9 further comprising separating said beads from the formed particles.

17. A method as claimed in claim 9 wherein said inert elements comprise high density particles.

* * * * *